United States Patent
Farrugia et al.

(10) Patent No.: US 9,617,437 B2
(45) Date of Patent: *Apr. 11, 2017

(54) ANTI-BACTERIAL AQUEOUS INK COMPOSITIONS COMPRISING SELF-DISPERSED SULFONATED POLYESTER-SILVER NANOPARTICLE COMPOSITES

(71) Applicant: Xerox Corporation, Norwalk, CT (US)

(72) Inventors: Valerie M. Farrugia, Oakville (CA); Alana Rah Desouza, London (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/706,097

(22) Filed: May 7, 2015

(65) Prior Publication Data

US 2016/0326390 A1    Nov. 10, 2016

(51) Int. Cl.
| | |
|---|---|
| C09D 11/30 | (2014.01) |
| C08K 3/28 | (2006.01) |
| B41M 5/00 | (2006.01) |
| C09D 11/104 | (2014.01) |
| C09D 11/322 | (2014.01) |
| B41M 5/025 | (2006.01) |

(52) U.S. Cl.
CPC .......... *C09D 11/30* (2013.01); *B41M 5/0023* (2013.01); *B41M 5/0088* (2013.01); *B41M 5/0256* (2013.01); *C08K 3/28* (2013.01); *C09D 11/104* (2013.01); *C09D 11/322* (2013.01)

(58) Field of Classification Search
CPC .................................................. C09D 11/30
See application file for complete search history.

(56) References Cited

U.S. PATENT DOCUMENTS

| | | |
|---|---|---|
| 5,389,958 A | 2/1995 | Bui et al. |
| 6,210,474 B1 | 4/2001 | Romano et al. |
| 7,312,011 B2 | 12/2007 | Patel et al. |
| 8,616,694 B2 | 12/2013 | Kagata et al. |
| 9,243,141 B1 * | 1/2016 | Farrugia .............. C08L 67/02 |

(Continued)

OTHER PUBLICATIONS

Karanikas et al., "Preparation of novel ink-jet inks with anti-microbial and bacteriostatic properties to be used for digital printing of polyester and polyamide fibers," Progress in Organic Coatings, 76 (2013), pp. 1112-1118.

(Continued)

*Primary Examiner* — Stephen Meier
*Assistant Examiner* — Alexander D Shenderov
(74) *Attorney, Agent, or Firm* — Marylou J. Lavoie, Esq. LLC

(57) ABSTRACT

An aqueous ink composition including water; an optional co-solvent; an optional colorant; and a composite comprising a sulfonated polyester matrix having a plurality of silver nanoparticles dispersed within the matrix. A process including incorporating the aqueous ink into an ink jet printing apparatus; ejecting droplets of ink in an imagewise pattern onto an intermediate transfer member or directly onto a final image receiving substrate; optionally, heating the image to partially or completely remove solvents; and optionally, when an intermediate transfer member is used, transferring the ink in the imagewise pattern from the intermediate transfer member to a final recording substrate.

21 Claims, 5 Drawing Sheets

(56) References Cited

U.S. PATENT DOCUMENTS

| | | | |
|---|---|---|---|
| 2003/0187097 A1* | 10/2003 | Chen | C09D 11/32 523/160 |
| 2009/0155712 A1* | 6/2009 | Sacripante | C08J 3/07 430/137.22 |
| 2010/0150980 A1* | 6/2010 | Bokorny | A01N 25/12 424/421 |
| 2013/0189499 A1 | 7/2013 | Blanton et al. | |
| 2014/0204162 A1 | 7/2014 | Keoshkerian et al. | |
| 2015/0116414 A1 | 4/2015 | Eliyahu et al. | |
| 2016/0122499 A1* | 5/2016 | Farrugia | C08K 3/08 524/440 |
| 2016/0122500 A1* | 5/2016 | Farrugia | C08K 3/28 424/619 |
| 2016/0215104 A1* | 7/2016 | Farrugia | C08J 3/126 |
| 2016/0215107 A1* | 7/2016 | Farrugia | C08J 3/212 |

OTHER PUBLICATIONS

Song et al., Preparation, characterization, and antibacterial activity studies of silver loaded poly (styrene-co-acrylic acid) nanocomposites, Materials Science and Engineering C 36, 146-151, available online Dec. 7, 2013.

Kundu et al., Micelle bound redox dye marker for nanogram level arsenic detection promoted by nanoparticles, New J. Chem., 2002, 26, pp. 1081-1084.

Thurman et al., "The molecular mechanisms of copper and silver ion disinfection of bacteria Q2 and viruses," Critical Reviews in Environmental Control, vol. 18, Issue 4, 1989, 295-315.

Ghosh et al., "Silver and Gold Nanocluster Catalyzed Reduction of Methylene Blue by Arsine in a Micellar Medium," Langmuir, 2002, 18, 8756-8760.

Yasuyuki et al., "Antibacterial properties of nine pure metals: a laboratory study using *Stapyloccus aureus* and *Escherichia coli*," Biofouling: The Journal of Bioadhesion and Biofilm Research, Oct. 2010; 26 (7): 851-8.

Valerie M. Farrugia, et al., U.S. Appl. No. 14/531,900, filed Nov. 1, 2014, "Metal Nanoparticle-Sulfonated Polyester Composites and Methods of Making the Same," not yet published.

Valerie M. Farrugia, et al., U.S. Appl. No. 14/706,048, filed May 7, 2015, "Antimicrobial Sulfonated Polyester Resin," not yet published.

Valerie M. Farrugia, et al., U.S. Appl. No. 14/706,037, filed May 7, 2015, "Antimicrobial Toner," not yet published.

Valerie M. Farrugia, et al., U.S. Appl. No. 14/706,027, filed May 7, 2015, "Metallo Ionomer Polymers," not yet published.

Anitha Sironmani et al., "Silver Nanoparticles—Universal Multi-functional Nanoparticles for Bio Sensing, Imaging for Diagnostics and Targeted Drug Delivery for Therapeutic Applications, Drug Discovery and Development—Present and Future," Dr. Izet Kapetanovic (ed.), ISBN: 978-953-307-61507, InTech, Dec. 16, 2011.

Kavitha et al., "Nanosilver/hyperbranched polyester (HBPE): synthesis, characterization, and anti-bacterial activity," J. Coat. Technol. Res., Sep. 2013, vol. 10, Issue 5, pp. 669-670.

S. Mukherjee et al., Potential Theranostics Application of Bio-Synthesized Silver Nanoparticles (4-in-1 System), Theranotics, Jan. 29, 2014, pp. 316-335.

Tsavalas et al., "Grafting Mechanisms in Hybrid Miniemulsion Polymerization," Journal of Applied Polymer Science, vol. 87, pp. 1825-1836 (2003).

Adams et al., "Size-Dependent Antimicrobial Effects of Novel Palladium Nanoparticles," Plos One, vol. 9, Issue 1, Jan. 2014.

Rashid et al., "Synthesis of Silver Nano Particles (Ag—NPs) and their uses for Quantitative Analysis of Vitamin C Tablets," J. Pharm. Sci., 12(1): 29-33, Jun. 2013.

* cited by examiner

ANTI-BACTERIAL AQUEOUS INK COMPOSITIONS COMPRISING SELF-DISPERSED SULFONATED POLYESTER-SILVER NANOPARTICLE COMPOSITES

BACKGROUND

Disclosed herein is an aqueous ink composition comprising water; an optional co-solvent; an optional colorant; and a composite comprising a sulfonated polyester matrix having a plurality of silver nanoparticles dispersed within the matrix.

There is a growing problem related to bacterial and fungal contamination through contact with surfaces and objects especially within hospitals, medical clinics, airplanes, and cruise ships, to mention a few. Individuals suffering from gastroenteritis, for example, can easily spread the illness by touching handrails, shared utensils, elevator buttons, etc. In some cases, contamination can be deadly especially in the cases of outbreaks of gastroenteritis acquired on cruise ships caused by Noroviruses or food poisoning due to particular strains of *Escherichia coli* and *Salmonella*. Another bacterium, *Staphylococcus aureus*, is a major culprit for many illnesses and skin irritations. There is a type of *Staphylococcus aureus* that is Methicillin-resistant (known as MRSA) which is resistant to the antibiotic methicillin and other drugs in this class.

The use of an organic biocide in materials such as polymers, inks toners, etc., for preventing microbial growth, is described, for example, in U.S. Pat. No. 6,210,474, which is hereby incorporated by reference herein in its entirety. However, anti-microbial effectiveness within a printed or coated state of a printed ink or toner has not been described or demonstrated. As well, many anti-microbially active compounds are not compatible with aqueous ink jet ink formulations or include using solvents such as dimethylsulfoxide. Also, some ink jet ink compositions contain silver or even gold particles to produce metallic glossy prints, but have not been described or demonstrated to possess anti-microbial effectiveness. See, for example, U.S. Pat. No. 8,616,694, which is hereby incorporated by reference herein in its entirety, which describes an ink jet recording method including an ink composition containing a glitter pigment.

U.S. Patent Application 20130189499, which is hereby incorporated by reference herein in its entirety, describes inks which include a mixture of solvent and a silver salt biocide including a silver sulfate biocide. Here, the clear or colored ink is applied in an imagewise fashion to a substrate, with fixing the clear or colored ink to the substrate whereby an effective coating or image article is formed that provides anti-bacterial and antifungal protection.

A need remains for aqueous anti-bacterial ink compositions. Further, a need remains for aqueous anti-bacterial ink compositions having anti-microbial effectiveness within a printed or coated state of the printed ink. Further, a need remains for aqueous anti-bacterial ink compositions having anti-microbial effectiveness within a printed or coated state of the printed ink, that are environmentally friendly, and that do not require organic solvents.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an aqueous ink composition comprising water; an optional co-solvent; an optional colorant; and a composite comprising a sulfonated polyester matrix having a plurality of silver nanoparticles dispersed within the matrix.

Also described is a process comprising incorporating an aqueous ink comprising water; an optional co-solvent; an optional colorant; and a composite comprising a sulfonated polyester matrix having a plurality of silver nanoparticles dispersed within the matrix. into an ink jet printing apparatus; ejecting droplets of ink in an imagewise pattern onto an intermediate transfer member or directly onto a final image receiving substrate; optionally, heating the image to partially or completely remove solvents; and optionally, when an intermediate transfer member is used, transferring the ink in the imagewise pattern from the intermediate transfer member to a final recording substrate.

DETAILED DESCRIPTION

Figure 1:
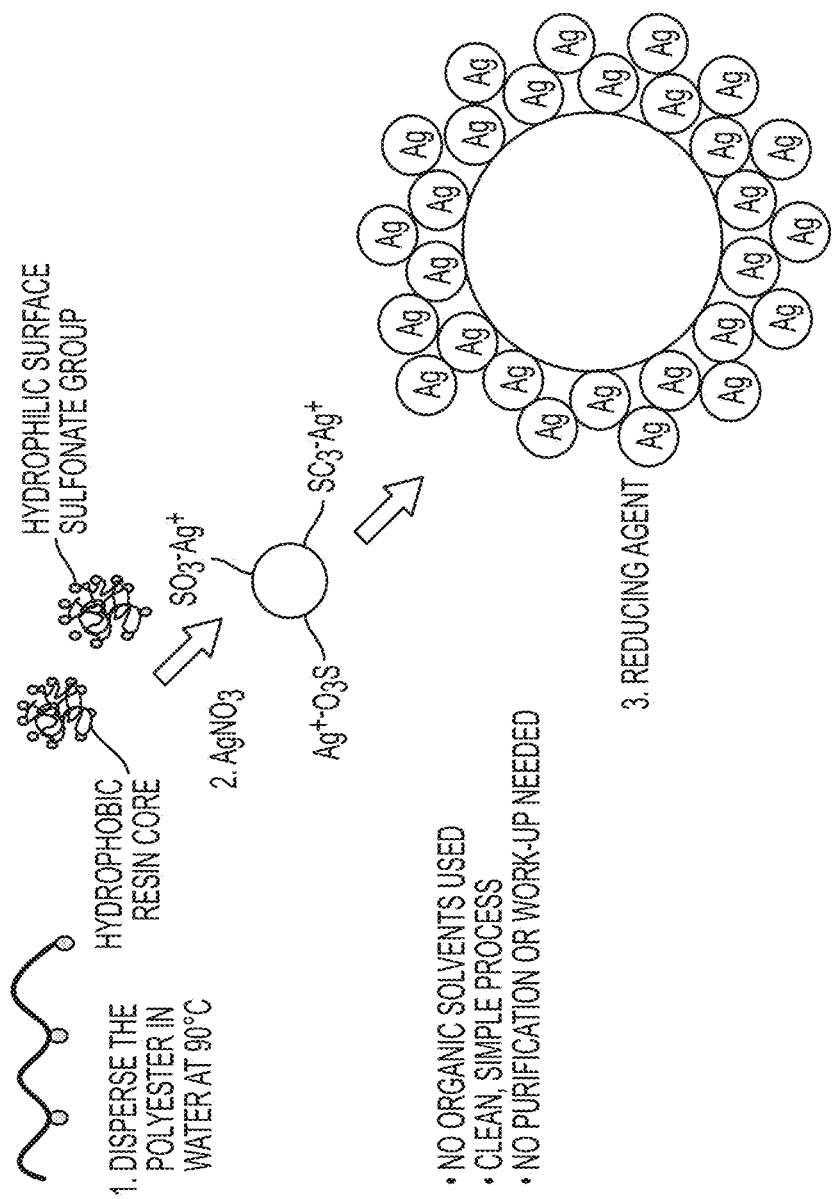
FIG. 1 shows a schematic of a possible mechanism of sodio sulfonated polyester self-assembly in the presence of Ag.

An aqueous ink composition is provided comprising water; an optional co-solvent; an optional colorant; and a composite comprising a sulfonated polyester matrix having a plurality of silver nanoparticles dispersed within the matrix.

Anti-bacterial inks are described that are synthesized as water based ink jet inks. Therefore, the present inks are environmentally friendly as they do not require organic solvents. Further, the anti-bacterial activity is the result of the silver nanoparticles reduced within the polymer matrix, in contrast to other water based anti-bacterial inks that use silver salt biocides, such as silver nitrate, silver chloride, silver bromide, silver iodide, silver iodate, silver bromate, silver sulfate, silver tungstate, or silver phosphate. See Karanikas, E. K., Nikolaidis, N. F., and Tsatsaroni, E. G., Preparation of novel ink-jet inks with anti-microbial and bacteriostatic properties to be used for digital printing of polyester and polyamide fibers, Progress in Organic Coatings, 76 (2013), pages 1112-1118.

An advantage of the present silver nanoparticle based anti-bacterial water based ink compared to ionic silver is that silver nanoparticles are not water soluble, and, therefore, silver colloids will not release silver ions into the environment. Silver nanoparticles do not last as nanoparticles in nature for very long, but grow to harmless clumps of silver metal which is harmless, having existed as such in nature since the beginning of the planet. See Anitha, Sironmani and Kiruba, Daniel, Silver Nanoparticles—Universal Multifunctional Nanoparticles for Bio-sensing, Imaging for Diagnostics and Targeted Drug Delivery for Therapeutic Applications," www.intechopen.com.

The anti-bacterial aqueous ink compositions herein can be applied to indirect printing applications wherein the ink is first applied imagewise onto an intermediate receiving member such as a drum, belt, etc., using an ink jet print head. The ink wets and spreads on the intermediate receiving member to form a transient image. The transient image then undergoes a change in properties such as partial or complete drying, thermal or photo-curing, gelation, etc., and the resulting transient image is then transferred to the final image receiving substrate. The inks can be designed and optimized to be compatible with the different subsystems including jetting, transfer, etc., that enable high quality printing at high speed.

Ink jet printing is one of the fastest growing imaging technologies. Some advantages of ink jet printing compared to other printing methods is the simplicity, lower production costs, reduced effluent waste, and less water and energy consumption. Based on the growing need for high performing products, especially when related to health and hygiene, the present water based digital printing inks with anti-bacterial properties fill a market need and provide consumers with a robust, effective, and lasting anti-microbial protection on any printable surface. Some key environments that can benefit from printing with the present aqueous anti-bacterial inks include hospitals, daycare centers, care homes, schools, dental offices, doctor offices, other types of medical offices, veterinary practices, kitchens, and restaurants. The present silver-based inks render any product more hygienic, helping the product maintain a fresh appearance by reducing or avoiding altogether odor causing or staining microbes and also avoid degradation of any important identification tag, label, or drug identification number (DIN) by the microbes themselves. Silver is considered an ideal anti-microbial agent because it has a high effectiveness against a wide range of relevant microbes and is regarded as non-toxic, especially considering the low concentrations needed for effective decontamination.

The aqueous anti-bacterial inks herein can be used for any suitable or desired application. The inks are particularly suitable for anti-bacterial printing applications having the final goal of producing customizable, digitized anti-bacterial printed images, text, coatings, etc. Examples of applications include printing codes, labels, or logos on medical devices such as catheters, thermometers, and other medical devices, printing on menus, food packaging materials, cosmetic tools and products, etc.

Silver is known to have strong anti-bacterial effects, broad-spectrum biocidal activity and low toxicity to mammalian cells. See Cunfeng Song, Ying Chang, Ling Cheng, Yiting Xu, Xiaoling Chen, Long Zhang, Lina Zhong, Lizong Dai, Preparation, characterization, and anti-bacterial activity studies of silver-loaded poly(styrene-co-acrylic acid) nanocomposites, Materials Science and Engineering: C, Volume 36, 1 Mar. 2014, pages 146-151.

There is a great commercial demand for anti-bacterial coatings to satisfy the general demands for hygiene in daily life. Ionic silver of Ag+ has some anti-bacterial activity; however, nano-Ag appears to be significantly more efficient than ionic Ag in its anti-bacterial activity. See C. Kavitha, K. Priya Dasan, Nanosilver/hyperbranched polyester (HBPE): synthesis, characterization, and anti-bacterial activity, J. Coat. Technol. Res., 10(5) pages 6690678, 2013, 675.

Silver nanoparticles (AgNPs) have anti-bacterial properties. However, the exact mechanism of anti-bacterial activity using AgNPs is poorly understood. The AgNPs may interact with the cell wall of the bacteria, consequently destabilizing the plasma-membrane potential and reducing the levels of intracellular adenosine triphosphate (ATP) resulting in bacterial cell death. See Mukherjee, S., Chowdhury, D., Kotcherlakota, R., Patra, S., Vinothkumar, B., Bhadra, M., Sreedhar, B., and Patra, C., Potential Theranostics Application of Bio-Synthesized Silver Nanoparticles (4-in-1 System), Theranotics 2014; 4(3), pages 316-335. Furthermore, AgNPs have been reported to take part in chemical reduction-oxidation reactions as a catalyst by facilitating electron transfer between an electron donor and electron acceptor. See Kundu, S., Ghosh, S., Mandal, M., and Pal, T., Micelle bound redox dye marker for nanogram level arsenic detection promoted by nanoparticles, New J. Chem., 2002, 26, pages 1081-1084.

Silver nanoparticles are known to exhibit anti-microbial or anti-bacterial properties by way of the oligodynamic effect which is defined as "a toxic effect of metal ions on living cells, algae, molds, spores, fungi, viruses, prokaryotic and eukaryotic microorganisms, even in relatively low concentrations." (Wikipedia definition)

The proposed antimicrobial mechanism based on scientific data (Benson, H. J. 2002. *Microbiological applications: Laboratory manual in general microbiology, Eighth Edition*, McGraw Hill: New York) shows that the metal ions may denature the proteins of the target cells by binding to reactive groups resulting in their precipitation and inactivation. The cellular proteins have a high affinity for the metallic ions which then causes accumulation of the ions within the cells resulting in their death. The silver ion specifically binds with sulfhydryl groups within the cell enzymes to form silver sulfides due to their sulfhydryl-binding affinity thereby disrupting cell membranes, disabling proteins and inhibiting enzyme activities (Thurman, R. B. and C. P. Gerba. 1988. *The molecular mechanisms of copper and silver ion disinfection of bacteria Q2 and viruses. Crit. Rev. Environ. Cont.* 18: 295-315). Silver ions are also known to bind to DNA, RNA and cellular proteins causing cell damage and death.

In embodiments, aqueous polymer-silver nanocomposites are incorporated into ink compositions for anti-bacterial applications. The ink compositions enable customizable, digitized anti-bacterial printing. Examples of applications include, but are not limited to, printing codes, labels, and logos on medical devices including catheters, thermometers, and other medical devices, printing on menus, food packaging materials, cosmetic tools and products, and any application where one desires a hygienic surface.

The anti-bacterial aqueous ink compositions herein contain a self-dispersed polymeric metal composite. The polymeric metal composite is prepared via an environmentally friendly method; that is, by green chemistry.

In embodiments, the polymeric metal composite comprises a silver-sodio sulfonated polyester complex. The silver sodio sulfonated polyester complex can be simultaneously synthesized during the self-assembly or dispersing of polymer in water at 90° C. The sodio sulfonated polyester serves as both a carrier for the Ag ions and an organic matrix for the in situ synthesis of silver nanocomposites. A mild reducing agent can optionally be added during the self-assembly of sodio sulfonated polyester to reduce silver nitrate into silver nanoparticles (AgNPs) resulting in well dispersed particles. The polyester matrix plays an important role in inhibiting the agglomeration of AgNPs. This is the latex or binding functional component used in the aqueous ink formulation herein which provides the anti-bacterial/anti-microbial properties to the ink. Advantageously, no organic solvents are used in the process, the process is clean and simple, and no purification or work-up is needed.

Silver sulfonated polyester complexes for use in the aqueous ink compositions herein can be prepared as described in U.S. patent application Ser. No. 14/531,900, which is hereby incorporated by reference herein in its entirety, which describes methods of synthesizing silver nanoparticles (AgNPs) by reduction of silver (I) ion simultaneously during the self-assembly of sodio sulfonated polyester resin particles in water. The methods which employ water as the bulk solvent are environmentally friendly being free of organic solvents. The methods are efficient requiring minimal time to prepare the polymer metal nanocomposites. Without being bound by theory, it is postulated that silver ions are trapped within the polymer matrix during the self-assembly of the sodio sulfonated polyester while simultaneously being reduced to AgNPs. The silver sulfonated polyester complexes are simultaneously synthesized during the self-assembly or dispersing of polymer in water as indicated in FIG. 1. Thus, the sodio sulfonated polyester serves as both a carrier for the silver ions and an organic matrix for the in situ synthesis of silver nanocomposites. The reducing agent is added during the self-assembly of sodio sulfonated polyester to reduce silver nitrate into silver nanoparticles (AgNPs) resulting in well dispersed particles. The polyester matrix plays an important role as it is postulated to inhibit the agglomeration of AgNPs. Meanwhile, the porosity of the sulfonated polyester allows the silver ions to diffuse and/or absorb throughout the polymer matrix allowing unhindered interaction with the sulfonate functional groups of the polyester. The reducing agent employed in the reduction of silver ion also freely diffuses throughout the polyester matrix and promotes the formation of well-dispersed AgNPs on the surface and interior of the polyester particles. Advantageously, the process minimizes nanoparticle agglomeration that plagues conventional methods with pre-formed nanoparticles. The sulfonated polymer matrix has an important role in keeping the AgNPs dispersed as well as maintaining overall chemical and mechanical stability of the composite.

The anti-bacterial aqueous ink compositions herein comprise self-dispersed sulfonated polyester-silver nanoparticle composites. In embodiments, the composites are prepared by synthesizing silver nanoparticles (AgNPs) by reduction of silver (I) ion simultaneously during the self-assembly of sodio sulfonated polyester resin particles in water. The methods which employ water as the bulk solvent are environmentally friendly being free of organic solvents. The methods are efficient requiring minimal time to prepare the polymer metal nanocomposites. Without being bound by theory, it is postulated that silver ions are trapped within the polymer matrix during the self-assembly of the sodio sulfonated polyester while simultaneously being reduced to AgNPs. The silver sulfonated polyester complexes are simultaneously synthesized during the self-assembly or dispersing of polymer in water as indicated in FIG. 1. Thus, the sodio sulfonated polyester serves as both a carrier for the silver ions and an organic matrix for the in situ synthesis of silver nanocomposites. The reducing agent is added during the self-assembly of sodio sulfonated polyester to reduce silver nitrate into silver nanoparticles (AgNPs) resulting in well dispersed particles. The polyester matrix plays an important role as it is postulated to inhibit the agglomeration of AgNPs. Meanwhile, the porosity of the sulfonated polyester allows the silver ions to diffuse and/or absorb throughout the polymer matrix allowing unhindered interaction with the sulfonate functional groups of the polyester. The reducing agent employed in the reduction of silver ion also freely diffuses throughout the polyester matrix and promotes the formation of well-dispersed AgNPs on the surface and interior of the polyester particles. Advantageously, the process minimizes nanoparticle agglomeration that plagues conventional methods with pre-formed nanoparticles. The sulfonated polymer matrix has an important role in keeping the AgNPs dispersed as well as maintaining overall chemical and mechanical stability of the composite.

The sulfonated polyester resins disclosed herein have been selected to have a hydrophobic backbone while presenting hydrophilic sulfonate groups attached along the chain. Without being bound by theory, when placed in water and heated, the hydrophobic portions may interact with each other to form a hydrophobic core with the hydrophilic sulfonate groups facing the surrounding water resulting in the sulfonated polyester self-assembling into a higher order, spherical nanoparticle without the requirement of additional reagents. Thus, there is a higher order involving the amphiphilic polyester, in which the hydrophobic backbone, which is insoluble in water, and the water-soluble hydrophilic sulfonate groups, operate as macrosurfactants. This results in self-association, self-assembly, self-dispersible nanoparticles in aqueous medium to yield micelle-like aggregates. The formation of silver nanoparticles within and surrounding the micelles is a secondary occurrence upon addition of silver nitrate and reducing agent.

In embodiments, there are provided composites comprising a sulfonated polyester matrix, and a plurality of silver nanoparticles dispersed within the matrix.

In embodiments, the sulfonated polyester matrix is a branched polymer. In embodiments, the sulfonated polyester matrix is a linear polymer. The selection of branched or linear polymer may depend on, inter alia, the downstream application of the composite product. Linear polymers can be used to create strands of fibers or form a strong mesh-like structure. Branched polymers may be useful to confer thermoplastic properties on the resultant composite material.

Both linear amorphous and branched amorphous sulfonated polyester resins are alkali sulfonated polyester resins. The alkali metal in the respective sulfonated polyester resins may independently be lithium, sodium, or potassium. In embodiments, the sulfonated polyester matrix is selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate), copoly(ethylene-neopentylene-5-sulfoisophthalate)-copoly-(ethylene-neopentylene-terephthalatephthalate), and copoly(propoxylated bisphenol A)-copoly-(propoxylated bisphenol A-5-sulfoisophthalate). Thus, in embodiments, the sulfonated polyester matrix is lithium, potassium, or sodium salt of a polymer selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate), copoly(ethylene-neopentylene-5-sulfoisophthalate)-copoly-(ethylene-neopentylene-terephthalatephthalate), and copoly(propoxylated bisphenol A)-copoly-(propoxylated bisphenol A-5-sulfoisophthalate).

In general, the sulfonated polyesters may have the following general structure, or random copolymers thereof in which the n and p segments are separated.

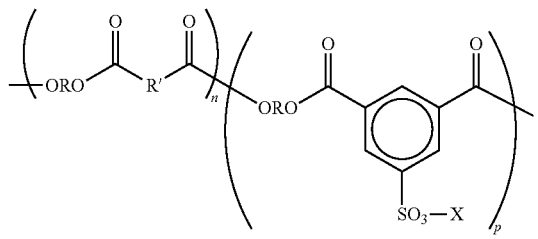

wherein R is an alkylene of, for example, from 2 to about 25 carbon atoms such as ethylene, propylene, butylene, oxyalkylene diethyleneoxide, and the like; R' is an arylene of, for example, from about 6 to about 36 carbon atoms, such as a benzylene, bisphenylene, bis(alkyloxy) bisphenolene, and the like; and p and n represent the number of randomly repeating segments, such as for example from about 10 to about 100,000.

Examples further include those disclosed in U.S. Pat. No. 7,312,011 which is hereby incorporated by reference herein in its entirety. Specific examples of amorphous alkali sulfonated polyester based resins include, but are not limited to, copoly(ethylene-terephthalate)-copoly-(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), and wherein the alkali metal is, for example, a sodium, lithium or potassium ion. Examples of crystalline alkali sulfonated polyester based resins include, but are not limited to, alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), and alkali copoly(5-sulfo-iosphthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-co-poly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl-copoly(butylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-iosphthaloyl)-copoly(butylene-adipate), alkali copoly(5-sulfo-isophthaloyl)-copoly(pentylene-adipate), alkali copoly(5-sulfoisophthaloyl)copoly(hexylene-adipate), poly(octylene-adipate), and wherein the alkali is a metal such as sodium, lithium or potassium. In embodiments, the alkali metal is lithium.

The linear amorphous polyester resins are generally prepared by the polycondensation of an organic diol and a diacid or diester, at least one of which is sulfonated or a sulfonated difunctional monomer being included in the reaction, and a polycondensation catalyst. For the branched amorphous sulfonated polyester resin, the same materials may be used, with the further inclusion of a branching agent such as a multivalent polyacid or polyol.

Examples of diacid or diesters selected for the preparation of amorphous polyesters include dicarboxylic acids or diesters selected from the group consisting of terephthalic acid, phthalic acid, isophthalic acid, sulfonated isophthalic acid, fumaric acid, maleic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester are selected, for example, from about 45 to about 52 mole percent of the resin. Examples of diols utilized in generating the amorphous polyester include trimethylolpropane, 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and mixtures thereof. The amount of organic diol selected can vary, and more specifically, is, for example, from about 45 to about 52 mole percent of the resin. In embodiments, the sulfonated polyester matrix comprises a polyol monomer unit selected from the group consisting of trimethylolpropane, 1,2-propanediol, diethylene glycol, and combinations thereof. In embodiments, the sulfonated polyester matrix comprises a polyol monomer unit selected from the group consisting of trimethylolpropane, 1,2-propanediol, diethylene glycol, and combinations thereof.

Alkali sulfonated difunctional monomer examples, wherein the alkali is lithium, sodium, or potassium, include dimethyl-5-sulfo-isophthalate, dialkyl-5-sulfo-isophthalate-4-sulfo-1,8-naphthalic anhydride, 4-sulfo-phthalic acid, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfo-pentanediol, 2-sulfo-hexanediol, 3-sulfo-2-methylpentanediol, N,N-bis(2-hydroxyethyl)-2-aminoethane sulfonate, 2-sulfo-3,3-dimethylpentanediol, sulfo-p-hydroxybenzoic acid, mixtures thereof, and the like. Effective difunctional monomer amounts of, for example, from about 0.1 to about 2 weight percent of the resin can be selected.

Branching agents for use in forming the branched amorphous sulfonated polyester include, for example, a multivalent polyacid such as 1,2,4-benzene-tricarboxylic acid, 1,2,4-cyclohexanetricarboxylic acid, 2,5,7-naphthalenetricarboxylic acid, 1,2,4- naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

Polycondensation catalyst examples for amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of, for example, from about 0.01 mole percent to about 5 mole percent based on the starting diacid or diester used to generate the polyester resin.

As used herein, references to "particle size" will generally refer to $D_{50}$ mass-median-diameter (MMD) or the log-normal distribution mass median diameter. The MMD is considered to be the average particle diameter by mass.

In embodiments, the composite has a particle size in a range of from about 5 nanometers (nm) to about 500 nm or from about 10 to about 200 nm, or from about 20 to about 100 nm. A composite particle size of less than 100 nm may be useful for reinforcement of polymer matrices without disturbing transparency and other properties of coatings. See, Tsavalas, J. G. et al. J. Appl. Polym. Sci., 87:1825-1836 (2003).

In embodiments, a loading of silver is present in the composite in a range of from about 100 parts per million (ppm) to about 10,000 ppm or from about 200 ppm (0.02%) to about 5,000 ppm (0.5%), or from about 500 ppm (0.05%) to about 1,000 ppm (0.1%). Loading concentrations of silver within these ranges can be used for anti-bacterial applications. Lower concentrations of silver might be sufficient for catalytic applications; concentrations of AgNPs as low as 1 ppm have been used in literature. See, Ghosh, S. K. et al. Langmuir. 18(23):8756-8760 (2002).

In embodiments, the silver nanoparticles have a particle size in a range of from about 2 nm to about 50 nm, or from about 10 nm to about 50 nm, or from about 20 nm to about 50 nm. Silver nanoparticles of a diameter less than 100 nm absorb light primarily below 500 nm. This property is useful as it allows the AgNPs to be used in combination with fluorescence emission detection since most fluorophores emit at a wavelength above 500 nm, thus minimizing quenching of the signal.

In embodiments, the silver nanoparticles may comprise solely elemental silver or may be a silver composite, including composites with other metals. Such metal-silver composite may include either or both of (i) one or more other metals and (ii) one or more non-metals. Suitable other metals include for example Al, Au, Pt, Pd, Cu, Co, Cr, In, and Ni, particularly the transition metals for example Au, Pt, Pd, Cu, Cr, Ni, and mixtures thereof. Exemplary metal composites are Au—Ag, Ag—Cu, Au—Ag—Cu, and Au—Ag—Pd. Suitable non-metals in the metal composite include for example Si, C, and Ge. The various components of the silver composite may be present in an amount ranging, for example, from about 0.01% to about 99.9% by weight, particularly from about 10% to about 90% by weight. In embodiments, the silver composite is a metal alloy composed of silver and one, two or more other metals, with silver comprising for example at least about 20% of the nanoparticles by weight, particularly greater than about 50% of the nanoparticles by weight. Unless otherwise noted, the weight percentages recited herein for the components of the silver-containing nanoparticles do not include the stabilizer.

While other metals can be used, only certain ones will have anti-bacterial properties. In embodiments, Co, Cu, Ni, Au and Pd can be used in a silver composite, wherein the Co, Cu, Ni, Au, Pd, or mixture or combination thereof can impart anti-bacterial and/or anti-microbial properties. See, for example, Yasuyuki M, Kunihiro K, Kurissery S, et al. Biofouling 2010 October; 26(7):851-8) describing Co, Cu, Ni as well as Au (and Pd). In embodiments, Ag and Cu are selected. In other embodiments, composites including Pt, Al, Cr, In, and mixtures and combinations thereof, can be selected.

In embodiments, the ink compositions herein contain a composite comprising a sulfonated polyester matrix having a plurality of silver nanoparticles dispersed within the matrix wherein the silver nanoparticles comprise a composite comprising silver and one or more other metals; wherein the silver nanoparticles comprise a composite comprising silver and one or more non-metals; or wherein the silver nanoparticles comprise a composite comprising silver, one or more other metals, and one or more non-metals.

Silver nanoparticles composed of a silver composite can be made for example by using a mixture of (i) a silver compound (or compounds, especially silver (I) ion-containing compounds) and (ii) another metal salt (or salts) or another non-metal (or non-metals) during the reduction step.

Those skilled in the art will appreciate that metals other than silver may be useful and can be prepared in accordance with the methods disclosed herein. Thus, for example, composites may be prepared with nanoparticles of copper, gold, palladium, or composites of such exemplary metals. See, for example, Adams C P, Walker K A, Obare S O, Docherty K M, PLoS One. 2014 Jan. 20; 9(1):e85981. doi: 10.1371/journal.pone.0085981, eCollection 2014, describing palladium as an anti-microbial.

In embodiments, the composites may comprise further nanostructured materials, such as, without limitation, carbon nanotubes (CNTs, including single-walled, double-walled, and multi-walled), graphene sheet, nanoribbons, nano-anions, hollow nanoshell metals, nano-wires and the like. In embodiments, CNTs may be added in amounts that enhance electrical and thermal conductivity.

In embodiments, there are provided methods comprising heating a sulfonated polyester resin in water, adding a solution of silver (I) ion to the heated resin in water to form a mixture, adding a solution of a reducing agent to the mixture, thereby forming an emulsion of composite particles comprising a sulfonated polyester matrix and a plurality of silver nanoparticles disposed within the sulfonated polyester matrix.

In embodiments, heating is conducted at a temperature of from about 65° C. to about 90° C.

In embodiments, a source of silver (I) ion is selected from silver nitrate, silver sulfonate, silver fluoride, silver perchlorate, silver lactate, silver tetrafluoroborate, silver oxide, and silver acetate. Silver nitrate is a common silver ion precursor for the synthesis of AgNPs.

In embodiments, the reducing agent is selected from ascorbic acid, trisodium citrate, glucose, galactose, maltose, lactose, gallic acid, rosmaric acid, caffeic acid, tannic acid, dihydrocaffeic acid, quercetin, sodium borohydride, potassium borohydride, hydrazine hydrate, sodium hypophosphite, hydroxylamine hydrochloride. In embodiments, reducing agents for the synthesis of AgNPs may include sodium borohydride or sodium citrate. Selection of appropriate reducing agent may provide access to desirable nanoparticle morphologies. For example, ascorbic acid was observed to provide silver nanoplate forms during a study directed to quantitation of vitamin C tablets. See, Rashid et al. J. Pharm. Sci. 12(1):29-33 (2013).

In embodiments, methods disclosed herein may be particularly well-suited for making composites with relatively low solids content. Under such conditions, silver ion and reducing agent may readily diffuse through the polymer matrix. In the case of silver ion, such ready diffusion may improve uniformity of distribution of silver throughout the matrix.

In the context of anti-microbial coatings, colloidal silver has been indicated to work as a catalyst disabling the enzyme that one-celled bacteria, fungi and viruses use for their metabolism. Many disease-causing organisms can be effectively eradicated in the presence of even minute traces of silver. Indeed, colloidal silver is effective against more than 650 different disease-causing pathogens. Unlike with antibiotics, strains resistant to silver have yet to be identified.

Tests showed that the branched sulfonated polyester (BSPE) and linear (unbranched) SPE-silver nanocomposites had excellent anti-bacterial properties in their virgin state, that is, without any other ink formulation components. This was analyzed qualitatively by briefly soaking a 1 micrometer pore size filter paper in a given solution, placing the membrane on a nutrient agar containing a bacterial culture swabbed on the surface, and allowing the plate to incubate for 2-3 days at 40° C. to allow for bacterial growth. The zone of clearing surrounding the membrane indicates the inhibition of bacterial growth in that region.

The ink herein is particularly useful for indirect printing applications wherein the ink wets the intermediate receiving member enabling formation of a transient image on the intermediate receiving member while undergoing a stimulus induced property change which enables release from the intermediate receiving member in the transfer printing step. In embodiments, the ink undergoes partial or complete drying while on the intermediate transfer member.

Ink compositions herein are specifically suitable for indirect printing systems, are compatible with different printing subsystems including jetting and transfer subsystems, and enable high quality printing at high speed. In embodiments, ink compositions herein enable and perform well in both wetting and transfer subsystems, displaying both acceptable wettability characteristics in combination with acceptable release and transfer characteristics.

The ink compositions herein can consist solely of water, or can comprise a mixture of water and a water soluble or water miscible component, referred to as a co-solvent, humectant, or the like (hereinafter co-solvent) such as alcohols and alcohol derivatives, including aliphatic alcohols, aromatic alcohols, dials, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidone, methoxylated glycerol, ethoxylated glycerol, and mixtures thereof.

When mixtures of water and water soluble or miscible organic solvent liquids are selected as the liquid vehicle, the water to organic co-solvent ratio ranges can be any suitable or desired ratio, in embodiments from about 100:0 to about 30:70, or from about 97:3 to about 40:60, or from about 95:5 to about 60:40. The non-water component of the liquid vehicle generally serves as a humectant or co-solvent which has a boiling point higher than that of water (100° C.). The co-solvent selected is one that will mix with water without phase separation; thus, a co-solvent having a polarity that is compatible with water is selected. The organic component of the ink vehicle can also serve to modify ink surface tension, modify ink viscosity, dissolve or disperse the colorant, and/or affect the drying characteristics of the ink. In embodiments, the ink is more attracted to paper substrates than plastic media as in solvent-based inks.

The water soluble or water miscible organics which are used in the ink formulation can help with surface tension, drying, leveling, etc. In embodiments, water makes up over 50% of the formulation, in embodiments water comprises from about 60 to about 70% of the ink composition. Thus, the ink compositions herein are mainly aqueous.

In certain embodiments, the co-solvent is selected from the group consisting of sulfolane, methyl ethyl ketone, isopropanol, 2-pyrrolidinone, polyethylene glycol, and mixtures thereof.

The total amount of liquid vehicle can be provided in any suitable or desired amount. In embodiments, the liquid vehicle is present in the ink composition in an amount of from about 75 to about 97 percent, or from about 80 to about 95 percent, or from about 85 to about 95 percent, by weight, based on the total weight of the ink composition.

The ink composition herein may also contain a colorant. Any suitable or desired colorant can be used in embodiments herein, including pigments, dyes, dye dispersions, pigments dispersions, and mixtures and combinations thereof.

The colorant may be provided in the form of a colorant dispersion. In embodiments, the colorant dispersion has an average particle size of from about 20 to about 500 nanometers (nm), or from about 20 to about 400 nm, or from about 30 to about 300 nm. In embodiments, the colorant is selected from the group consisting of dyes, pigments, and combinations thereof, and optionally, the colorant is a dispersion comprising a colorant, an optional surfactant, and an optional dispersant.

As noted, any suitable or desired colorant can be selected in embodiments herein. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like; as well as mixtures thereof.

Examples of suitable pigments include black pigments, white pigments, cyan pigments, magenta pigments, yellow pigments, and the like. Further, pigments can be organic or inorganic particles. Suitable inorganic pigments include carbon black. However, other inorganic pigments may be suitable such as titanium oxide, cobalt blue ($CoO-Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW 5160, FW 5170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The colorant can be present in the ink composition in any desired or effective amount, in embodiments, the colorant can be present in an amount of from about 0.05 to about 15 percent, or from about 0.1 to about 10 percent, or from about 1 to about 5 percent by weight, based on the total weight of the ink composition.

The inks disclosed may also contain a surfactant. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™ IGEPAL CA-520™, IGEPAL CA-720™, IGEPAL CO-890™, IGEPAL C0-720™, IGEPAL C0-290™, IGEPAL CA-210™, ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethylammonium chloride, dialkyl benzenealkyl ammonium chloride, lauryl trimethylammonium chloride, alkylbenzyl methylammonium chloride, alkyl benzyl dimethyl ammonium bromide, benzalkonium chloride, cetyl pyridinium bromide, C 12, C15, C17 trimethylammonium bromides, halide salts of quaternized polyoxyethylalkylamines, dodecylbenzyl triethylammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

The optional surfactant can be present in any desired or effective amount, in embodiments, the surfactant is present in an amount of from about 0.01 to about 5 percent by weight, based on the total weight of the ink composition. It should be noted that the surfactants are named as dispersants in some cases.

The ink composition can further comprise crosslinkers. In embodiments, the crosslinker is an organoamine, a dihydroxy aromatic compound, isocyanate, a peroxide, a metal oxide, or the like, as well as mixtures thereof. Crosslinking can further enhance the physical properties of the images generated from the ink composition. The crosslinker can be present in any desired or effective amount, in embodiments from about 0.1 to about 20 percent, or from 5 to about 15 percent, by weight, based on the total weight of the ink composition.

The ink composition can further comprise additives. Optional additives that can be included in the ink compositions include biocides, fungicides, pH controlling agents such as acids or bases, phosphate salts, carboxylates salts, sulfite salts, amine salts, buffer solutions, and the like, sequestering agents such as EDTA (ethylenediamine tetra acetic acid), viscosity modifiers, leveling agents, and the like, as well as mixtures thereof.

In embodiments, the ink composition is a low-viscosity composition. The term "low-viscosity" is used in contrast to conventional high-viscosity inks such as screen printing inks, which tend to have a viscosity of at least 1,000 centipoise (cps). In specific embodiments, the ink disclosed herein has a viscosity of no more than about 100 cps, no more than about 50 cps, or no more than about 20 cps, or from about 2 to about 30 cps at a temperature of about 30° C., although the viscosity can be outside of these ranges. When used in ink jet printing applications, the ink compositions are generally of a viscosity suitable for use in said ink jet printing processes. For example, for thermal ink jet printing applications, at room temperature (i.e., about 25° C.), the ink viscosity is at least about 1 centipoise, no more than about 10 centipoise, no more than about 7 centipoise, or no more than about 5 centipoise, although the viscosity can be outside of these ranges. For piezoelectric ink jet printing, at the jetting temperature, the ink viscosity is at least about 2 centipoise, at least about 3 centipoise, no more than about 20 centipoise, no more than about 15 centipoise, or no more than about 10 centipoise, although the viscosity can be outside of these ranges. The jetting temperature can be as low as about 20 to 25° C., and can be as high as about 70° C., as high as about 50° C., or as high as about 40° C., although the jetting temperature can be outside of these ranges.

In certain embodiments, the ink compositions herein have a viscosity of from about 2 to about 20 centipoise at a temperature of about 30° C.

The ink compositions herein have selected surface tension characteristics that provide wetting and release properties suitable for indirect printing applications. In embodiments, the ink composition is selected to provide a surface tension, viscosity, and particle size that is suitable for use in a piezoelectric ink jet print head.

In embodiments, the ink composition herein has a surface tension of from about 15 to about 50 dynes per centimeter, or from about 18 to about 38 dynes per centime, or from about 20 to about 35 dynes per centimeter, although the surface tension can be outside of these ranges.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes. Alternatively, the optional ink additives can be mixed with the other ink ingredients during the ink preparation process, which takes place according to any desired procedure, such as by mixing all the ingredients, heating if desired, and filtering.

In a specific embodiment, the inks are prepared as follows: 1) preparation of a sulfonated polyester silver nanoparticle composite; 2) preparation of a dispersion of a colorant optionally stabilized with a surfactant; 3) mixing of the composite with the colorant dispersion; 4) optional filtering of the mixture; 5) addition of other components such as water, co-solvents, and optional additives; and 6) optional filtering of the composition.

Also disclosed herein is a process which comprises applying an ink composition as disclosed herein to a substrate in an imagewise pattern. Also disclosed herein is a process which comprises applying an ink composition as disclosed herein to a substrate as an over coat, wherein the over coat can be clear, colored, or a combination thereof. In embodiments, the ink composition comprises a clear overcoat.

The ink compositions can be used in a process which entails incorporating the ink composition into an ink jet printing apparatus and causing droplets of the ink to be ejected in an imagewise pattern onto a substrate. In a specific embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed.

In a specific embodiment, a process herein comprises incorporating an ink prepared as disclosed herein into an ink jet printing apparatus, ejecting ink droplets in an imagewise pattern onto an intermediate transfer member, heating the image to partially or completely remove solvents, and transferring the ink in the imagewise pattern from the intermediate transfer member to a final recording substrate. In a specific embodiment, the intermediate transfer member is heated to a temperature above that of the final recording sheet and below that of the ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed as the final recording sheet, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like. In embodiments, the substrate comprises a three-dimensional substrate. In embodiments, the substrate comprises medical devices such as catheters, thermometers, cardiac stents, programmable pace makers, other medical devices, menus, food packaging materials, cosmetic tools and products, and any other desired three-dimensional substrate. In further embodiments, the substrate comprises customizable digitally printed ID codes, short-run printable materials three-dimensional medical and any other desired three-dimensional substrate.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

TABLE 1

Figure 2:
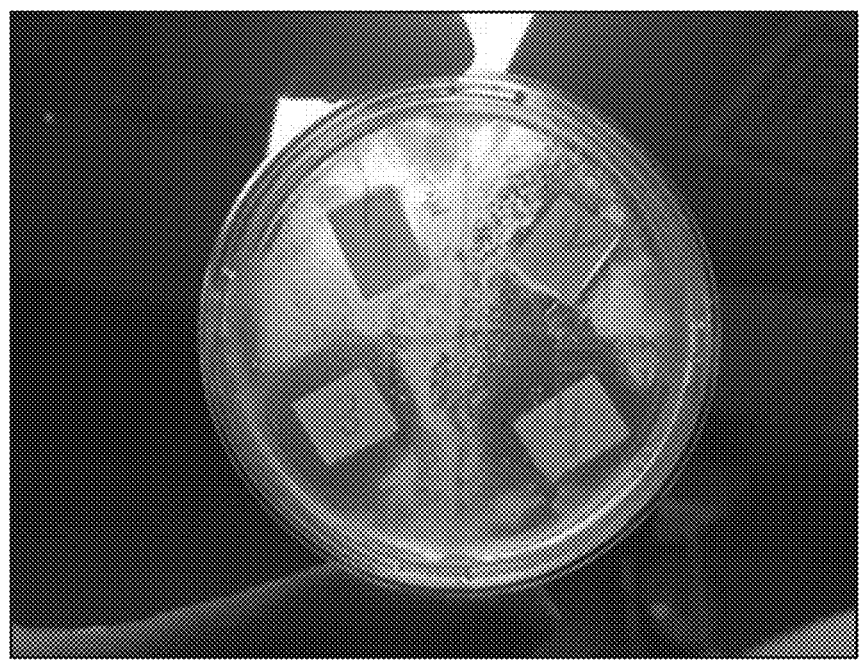
FIG. 2 is a grayscale image showing anti-bacterial activity of BSPE-AgNP composites.
Figure 4:
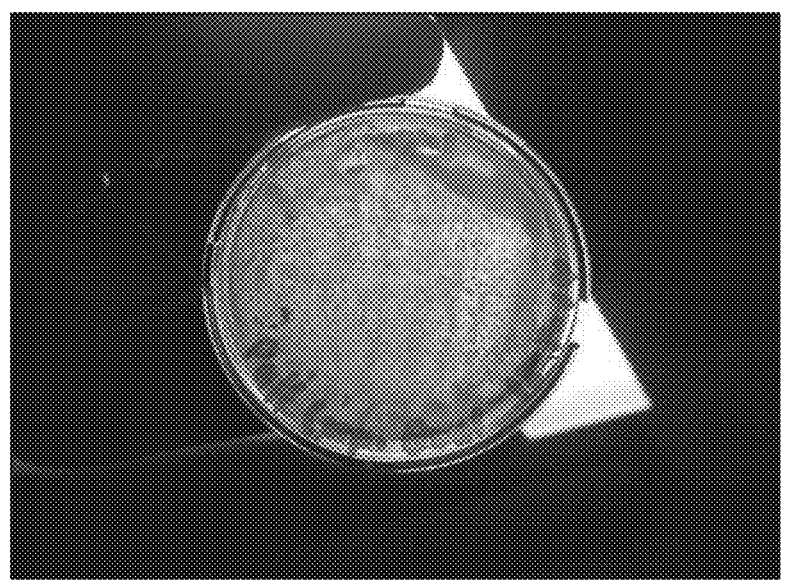
FIG. 4 is a grayscale image showing a streaked bacteria sample from one colony of resident and/or skin bacteria.

| Bacteria Sample | Description | Hours Incubated at 37° C. | Expected Results | Observation |
|---|---|---|---|---|
| Resident and/or Transient Skin Bacteria | Direct contact of finger with agar plate | 24 hours | Growth in fingerprint region | White and yellow colonies |
| See FIG. 2 | "fingerprint" bacteria + dip-coated BSPE alone - FIG. 2, quadrant 1 | 24 hours | Growth | Growth |
| | "fingerprint" bacteria + dip-coated AgNPs prepared via citrate reduction method - FIG. 2, quadrant 2 | 24 hours | Zone of Inhibition | Zone of Inhibition |
| | "fingerprint" bacteria + dip-coated BSPE-Ag - no reducing agent, FIG. 2, quadrant 3 | 24 hours | Zone of Inhibition | Zone of Inhibition |
| | "fingerprint" bacteria + dip-coated BSPE-Ag citrate reduction, FIG. 2, quadrant 4 | 24 hours | Zone of Inhibition | Zone of Inhibition |
| See FIG. 4 | Streaked bacteria sample from one colony of resident and/or skin bacteria (bacteria is from first row in this table) onto plate; no antibacterial agent. | 72 hours | Growth | Yellow, dense lawn |

TABLE 1-continued

Figure 5:
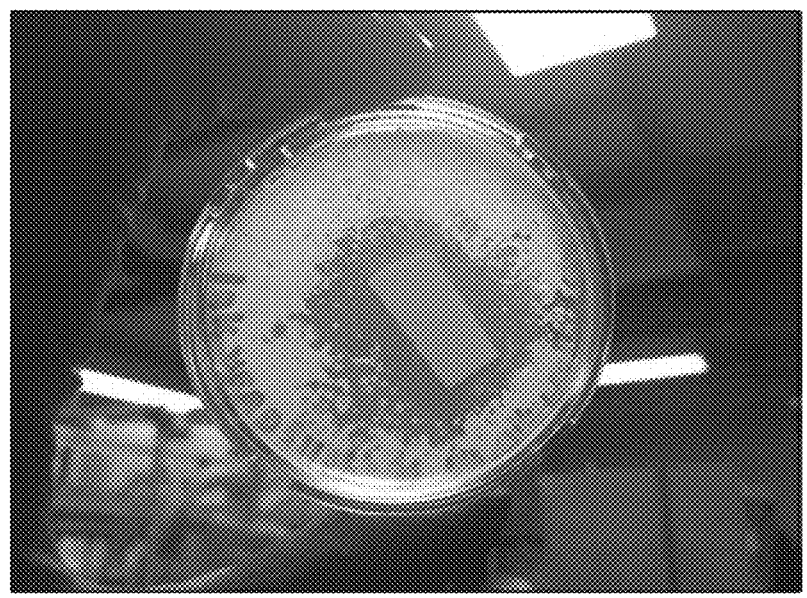
FIG. 5 is a grayscale image showing suction filtered ink of Example 3 onto a nitrocellulose membrane and placed on an inoculated plate.

| Bacteria Sample | Description | Hours Incubated at 37° C. | Expected Results | Observation |
|---|---|---|---|---|
| See FIG. 5 | Suction filtered ink of Example 3 onto a nitrocellulose membrane and place on plate inoculated with bacteria from row above | 72 hours | Zone of Inhibition | Zone of Inhibition |

Example 1

Comparative Example 1. Preparation of branched sodio sulfonated amorphous polyesters (BSPE-1). A branched amorphous sulfonated polyester resin comprised of 0.425 mole equivalent of terephthalate, 0.080 mole equivalent of sodium 5-sulfoisophthalic acid, 0.4501 mole equivalent of 1,2-propanediol, and 0.050 mole equivalent of diethylene glycol, was prepared as follows. In a one liter Parr reactor equipped with a heated bottom drain valve, high viscosity double turbine agitator, and distillation receiver with a cold water condenser was charged 388 grams of dimethyl terephthalate, 104.6 grams of sodium 5-sulfoisophthalic acid, 322.6 grams of 1,2-propanediol (1 mole excess of glycols), 48.98 grams of diethylene glycol, (1 mole excess of glycols), trimethylolpropane (5 grams), and 0.8 grams of butyltin hydroxide oxide as the catalyst. The reactor was heated to 165° C. with stirring for 3 hours and then again heated to 190° C. over a one hour period, after which the pressure was slowly reduced from atmospheric pressure to about 260 Torr over a one hour period, and then reduced to 5 Torr over a two hour period. The pressure was then further reduced to about 1 Torr over a 30 minute period and the polymer was discharged through the bottom drain onto a container cooled with dry ice to yield 460 grams of sulfonated polyester resin. The branched sulfonated polyester resin had a glass transition temperature measured to be 54.5° C. (onset) and a softening point of 154° C.

Example 2

Example 2. BSPE-AgNP composition to be used in ink formulation. The reaction was carried out in a 3 necked, 500 milliliter round bottom flask equipped with an overhead stirrer, reflux condenser, thermocouple, hot plate, and nitrogen entrance (the condenser acted as the nitrogen exit). 250 milliliters of deionized water was charged into the flask at room temperature (23° C.). The hot plate was set to 90° C. and nitrogen was run through the system (RPM=300). Once the temperature had stabilized, 21.61 grams of solid BSPE-1 of Example 1 was added to the system in a finely ground state (RPM=300). The solution became hazy and had a blue tinge. After 45 minutes, 0.0849 grams AgNO3 dissolved in 2 milliliters deionized water was added dropwise to the solution at a rate of approximately 1 drop/second (RPM=300). The solution became slightly darker (brownish). After 0.5 hours, the heating was stopped and the solution was allowed to cool to room temperature (RPM=300). The final appearance was a very light green/brown colored, slightly opaque solution.

TABLE 2

| Test | Ash | DSC - 2$^{nd}$ Onset Tg | DSC - 2$^{nd}$ Midpoint Tg | DSC - 2$^{nd}$ Offset | GPC - Mw | GPC - Mn | GPC - Polydispersity | ICP - Ag | TG - Residue | Ion Chromatography - Nitrate |
|---|---|---|---|---|---|---|---|---|---|---|
| Result | 2.13% | 55.21° C. | 49.7° C. | 64.19° C. | 3180 | 1392 | 2.284 | 1527 ppm | 2.948% wt. loss | 83.289 |

Example 3

Example 3. Ink formulation containing BSPE-AgNP composition of Example 2. To a 500 milliliter amber glass bottle was added the BSPE-AgNP emulsion of Example 2 and triethanolamine which was stirred for 2 minutes at 300 RPM. To the stirring mixture was added diethylene glycol, 1,5-pentanediol and glycerol. The mixture was stirred for 1 minute at 500 RPM. Next was added 2-ethyl-1-hexanol and polyethylene oxide (PEO) and the mixture was further stirred for an additional 1 minute at 500 RPM. The surfactants Silsurf®A008 (Siltech Corporation; low molecular weight ethoxylated polydimethylsiloxane/Silicone Polyether), Surfynol® 104H (Air Products and Chemicals, Inc.; 75% 2,4,7,9-Tetramethyl-5-decyne-4,7-diol, 25% Ethylene glycol), and Chemguard® S-761p [Chemguard Chemical; short-chain perfluoro-based anionic fluorosurfactant of the phosphate ester type (34% active solids) were added to the ink and the mixture was stirred for 45 minutes at 500 RPM. The ink was then homogenized for 5 minutes at 2000 RPM and filtered through a 0.45 micron filter before testing.

TABLE 3

| Component | Solids Weight % | Solids | Weight % | Grams |
|---|---|---|---|---|
| BSPE | 31.42% | 7.95% | 6.78% | 15.11 |
| AgNO$_3$ (as AgNPs in BSPE) | 0.12% | 0.03% | 0.03% | 0.06% |
| Diethylene Glycol | 18.05% | 100% | 3.89% | 8.68 |
| 1,5-Pentanediol | 24.09% | 100% | 5.20% | 11.58 |
| Glycerol | 16.87% | 100% | 3.64% | 8.11 |
| 2-ethyl-1-hexanol | 5.06% | 100% | 1.09% | 2.43 |
| PEO | 1.01% | 100% | 0.22% | 0.49 |
| Triethanolamine | 1.69% | 100% | 0.36% | 0.81 |
| Silsurf®A008 | 0.51% | 100% | 0.11% | 0.24 |

TABLE 3-continued

| Component | Solids Weight % | Solids | Weight % | Grams |
|---|---|---|---|---|
| Chemguard ® S-761p (34 Active) | 0.15% | 100% | 0.03% | 0.07 |
| Surfynol ® 104H | 1.04% | 100% | 0.22% | 0.5 |
| Water | N/A | 100% | 78.44% | 174.84 |
| Total | | | | 222.91 |
| Total weight of solids (grams) | 100% | | 100% | 48.07 |

For proof of concept, the inks were initially dip-coated in different substrates and placed onto an inoculated petri dish containing general purpose powdered medium for the cultivation of less fastidious microorganisms (nutrient agar; N0394 FLUKA). The total amount of silver in the ink composite was about 267 parts per million. Viable prints were made on the Dimatix Materials Printer DMP-2831 with this anti-bacterial non-pigmented ink.

FIG. 2 is an image showing the anti-bacterial activity of BSPE-AgNP composites. Qualitative filter paper was soaked for 5 seconds in various samples as follows. 1) BSPE alone; 2) AgNPs prepared via citrate reduction method; 3) BSPE-Ag with no reducing agent; and 4) BSPE-Ag-citrate reduction. FIG. 2 shows that BSPE alone is not able to kill bacteria. Citrate capped silver nanoparticles without any polymer partially inhibit the growth of bacteria, however, better results are observed for BSPE-silver composites prepared with or without a reducing agent. Without wishing to be bound by theory, it is believed that the reason BSPE-Ag was observed to be more effective than AGNPs alone is that the branched structure of the polymer helped to act as a binder to secure more of the composite to the paper membrane during the soak. Alternatively, the sulfonate groups of the BSPE might aid in the motility of silver ions through the matrix through electrostatic interactions.

The BSPE-Ag composite from FIG. 2, quadrant 3, Example 2, was incorporated into an aqueous ink. A qualitative test of the anti-bacterial properties was done by soaking various membranes in the ink and placing them on a nutrient agar plate with bacteria swabbed on the surface.

Figure 3:
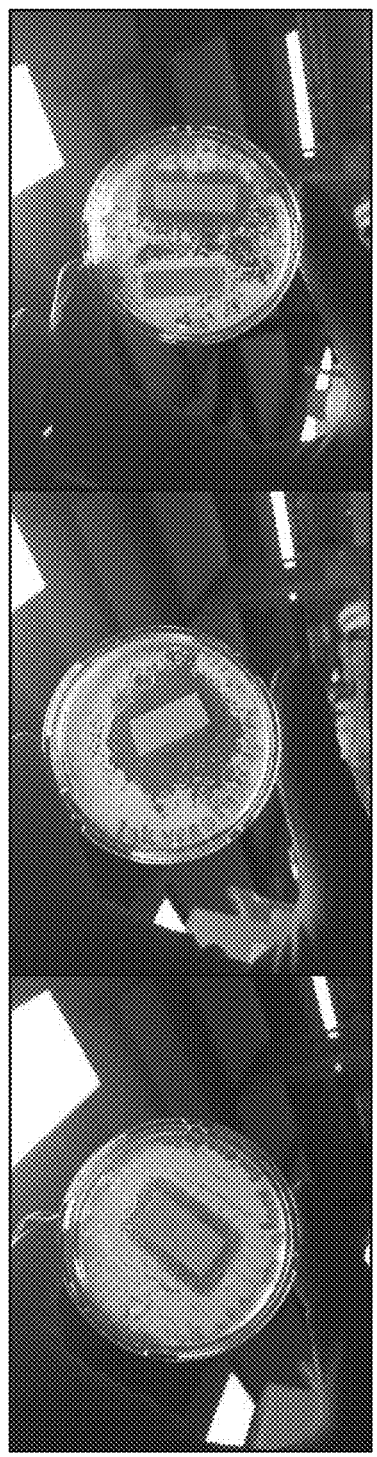
FIG. 3 is a grayscale image showing an ink soaked onto various membranes.

FIG. 3 is an image showing an ink soaked onto various membranes. As shown in FIG. 3, the ink had good anti-bacterial properties. See FIG. 3, glass microfiber (left picture of FIG. 3), nitrocellulose (middle picture of FIG. 3), and polyethersulfone (right picture of FIG. 3). The left hand side of the polyethersulfone plate is the membrane alone without anything on it. [$AgNO_3$]=0.03% (w/w).

FIG. 4 is an image showing a streaked bacteria sample from one colony of resident and/or skin bacteria (bacteria is from first row in Table 1) onto a plate having no anti-bacterial agent disposed thereon.

FIG. 5 is an image showing the suction filtered ink of Example 3 onto a nitrocellulose membrane and place on plate inoculated with bacteria from the row headed "FIG. 4" in Table 1.

The aqueous ink compositions herein can be used as clear ink jet over coats, as colored ink jet over coats, or for preparing colored ink jet images, all providing anti-bacterial and antifungal protection on a variety of substrates.

The ink compositions comprise a self-dispersible polyester-Ag nanocomposite. In embodiments, the Ag is present in the ink composition in an amount of from about 0.5 parts per million to about 5,000 parts per million, or from about 50 parts per million to about 500 parts per million.

An advantage of silver nanoparticles bound to larger particles, sediment, colloidal particle, or macromolecule comparted to ionic silver is that the present silver nanoparticles are not water soluble, and will not be freely released into the environment. The BSPE-AgNP system can act as a reservoir for the delivery of slow-paced dissolved silver ions for maximum anti-bacterial, antifungal, and antiviral biocide effect. In embodiments, the composite herein acts as a reservoir for the delivery of silver ions for anti-bacterial, antifungal, and antiviral biocide effect.

Silver exhibits anti-microbial activity against a broad range of microorganisms and due to increasing antibiotic resistance, there has recently been a renewed interest in using silver as an anti-bacterial agent.

The present aqueous ink compositions enable customizable digitally printed ID codes, short-run printable materials, printing on three-dimensional medical components such as catheters, cardiac stents, programmable pace makers, and any other desired three-dimensional substrate.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An aqueous ink composition comprising:
water;
an optional co-solvent;
an optional colorant; and
a composite comprising a sulfonated polyester matrix having a plurality of silver nanoparticles dispersed within the matrix.

2. The ink composition of claim 1, wherein the sulfonated polyester matrix comprises a branched polymer.

3. The ink composition of claim 1, wherein the sulfonated polyester matrix comprises a linear polymer.

4. The ink composition of claim 1, wherein the sulfonated polyester matrix is lithium, potassium, or sodium salt of a polymer selected from the group consisting of poly(1,2-propylene-5-sulfoisophthalate), poly(neopentylene-5-sulfoisophthalate), poly(diethylene-5-sulfoisophthalate), copoly-(1,2-propylene-5-sulfoisophthalate)-copoly-(1,2-propylene-terphthalate), copoly-(1,2-propylenediethylene-5-sulfoisophthalate)-copoly-(1,2-propylene-diethylene-terephthalatephthalate), copoly(ethylene-neopentylene-5-sulfoisophthalate)-copoly-(ethylene-neopentylene-terephthalatephthalate), and copoly(propoxylated bisphenol A)-copoly-(propoxylated bisphenol A-5-sulfoisophthalate).

5. The ink composition of claim 1, wherein the sulfonated polyester matrix comprises a polyol monomer unit selected from the group consisting of trimethylolpropane, 1,2-propanediol, diethylene glycol, and combinations thereof.

6. The ink composition of claim 1, wherein the sulfonated polyester matrix comprises a diacid monomer unit selected from the group consisting of terephthalic acid, sulfonated isophthalic acid, and combinations thereof.

7. The ink composition of claim 1, wherein the composite has a particle size in a range from about 5 nanometers to about 500 nanometers.

8. The ink composition of claim 1, wherein a loading of silver is present in the composite is in a range from about 0.5 parts per million to about 5,000 parts per million.

9. The ink composition of claim 1, wherein the silver nanoparticles have a particle size in a range from about 2 nanometers to about 50 nanometers.

10. The ink composition of claim 1, wherein the silver nanoparticles comprise a composite comprising silver and one or more other metals;
   wherein the silver nanoparticles comprise a composite comprising silver and one or more non-metals; or
   wherein the silver nanoparticles comprise a composite comprising silver, one or more other metals, and one or more non-metals.

11. The ink composition of claim 1, wherein the colorant is present and wherein the colorant is selected from the group consisting of dyes, pigments, and combinations thereof, and optionally, the colorant is a dispersion comprising a colorant, an optional surfactant, and an optional dispersant.

12. The ink composition of claim 1, wherein the ink composition comprises a clear overcoat.

13. The ink composition of claim 1, wherein the ink composition, when printed, provides anti-bacterial and anti-fungal properties to the substrate.

14. The ink composition of claim 1, wherein the composite acts as a reservoir for the delivery of silver ions for anti-bacterial, antifungal, and antiviral biocide effect.

15. The ink composition of claim 1, wherein the sulfonated polyester matrix comprises a sulfonated polyester resin having a hydrophobic backbone and hydrophilic sulfonate groups attached along a chain.

16. A process comprising:
   incorporating an aqueous ink comprising water; an optional co-solvent; an optional colorant; and a composite comprising a sulfonated polyester matrix having a plurality of silver nanoparticles dispersed within the matrix, into an ink jet printing apparatus;
   ejecting droplets of ink in an imagewise pattern onto an intermediate transfer member or directly onto a final image receiving substrate;
   optionally, heating the image to partially or completely remove solvents; and
   optionally, when an intermediate transfer member is used, transferring the ink in the imagewise pattern from the intermediate transfer member to a final recording substrate.

17. The process of claim 16, wherein the substrate comprises a three-dimensional substrate.

18. The process of claim 16, wherein the composite has a particle size in a range from about 5 nanometers to about 500 nanometers.

19. The process of claim 16, wherein a loading of silver is present in the composite is in a range from about 0.5 parts per million to about 5,000 parts per million.

20. The process of claim 16, wherein the silver nanoparticles have a particle size in a range from about 2 nanometers to about 50 nanometers.

21. The process of claim 16, wherein the composite acts as a reservoir for the delivery of silver ions for anti-bacterial, antifungal, and antiviral biocide effect.

* * * * *